(12) United States Patent
Totsuka et al.

(10) Patent No.: US 6,527,669 B2
(45) Date of Patent: Mar. 4, 2003

(54) HYDRAULIC CONTROL APPARATUS FOR A VEHICULAR AUTOMATIC TRANSMISSION

(75) Inventors: Hirohiko Totsuka, Saitama (JP); Eiji Ohyama, Saitama (JP); Masaaki Yamaguchi, Saitama (JP); Yoshimichi Tsubata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,581

(22) Filed: Sep. 5, 2001

(65) Prior Publication Data

US 2002/0028725 A1 Mar. 7, 2002

(30) Foreign Application Priority Data

Sep. 5, 2000 (JP) ........................................ 2000-268964

(51) Int. Cl.[7] ............................................... B60R 41/12
(52) U.S. Cl. .............................. 477/45; 477/50; 477/97
(58) Field of Search .............................. 477/45, 50, 97, 477/156, 906; 184/26, 29

(56) References Cited

U.S. PATENT DOCUMENTS

| 4,106,369 | A | * | 8/1978 | Taga | 475/127 |
| 4,751,858 | A | * | 6/1988 | Iwatsuki | 477/164 |
| 5,830,106 | A | * | 11/1998 | Abe | 477/906 |
| 6,135,919 | A | * | 10/2000 | Shimakura | 184/27.2 |
| 6,253,137 | B1 | * | 6/2001 | Abo et al. | 180/367 |

\* cited by examiner

Primary Examiner—Sherry Estremsky
Assistant Examiner—Tisha D. Lewis
(74) Attorney, Agent, or Firm—Lahive & Cockfield, LLP

(57) ABSTRACT

Leak oil from a regulator 24 for regulating the pressure of oil supplied to a lubricating system (the lubricating pressure) is supplied to an oil cooler 23. An electromagnetic valve 25 is connected to a pressure controlling and regulating oil chamber 24a of the regulator 24 so that the lubricating pressure can be controlled to be increased or decreased. The lubricating pressure is decreased while an engine is running in a low load state during a high-speed running to thereby increase the volume of oil to be supplied to the oil cooler 23.

4 Claims, 3 Drawing Sheets

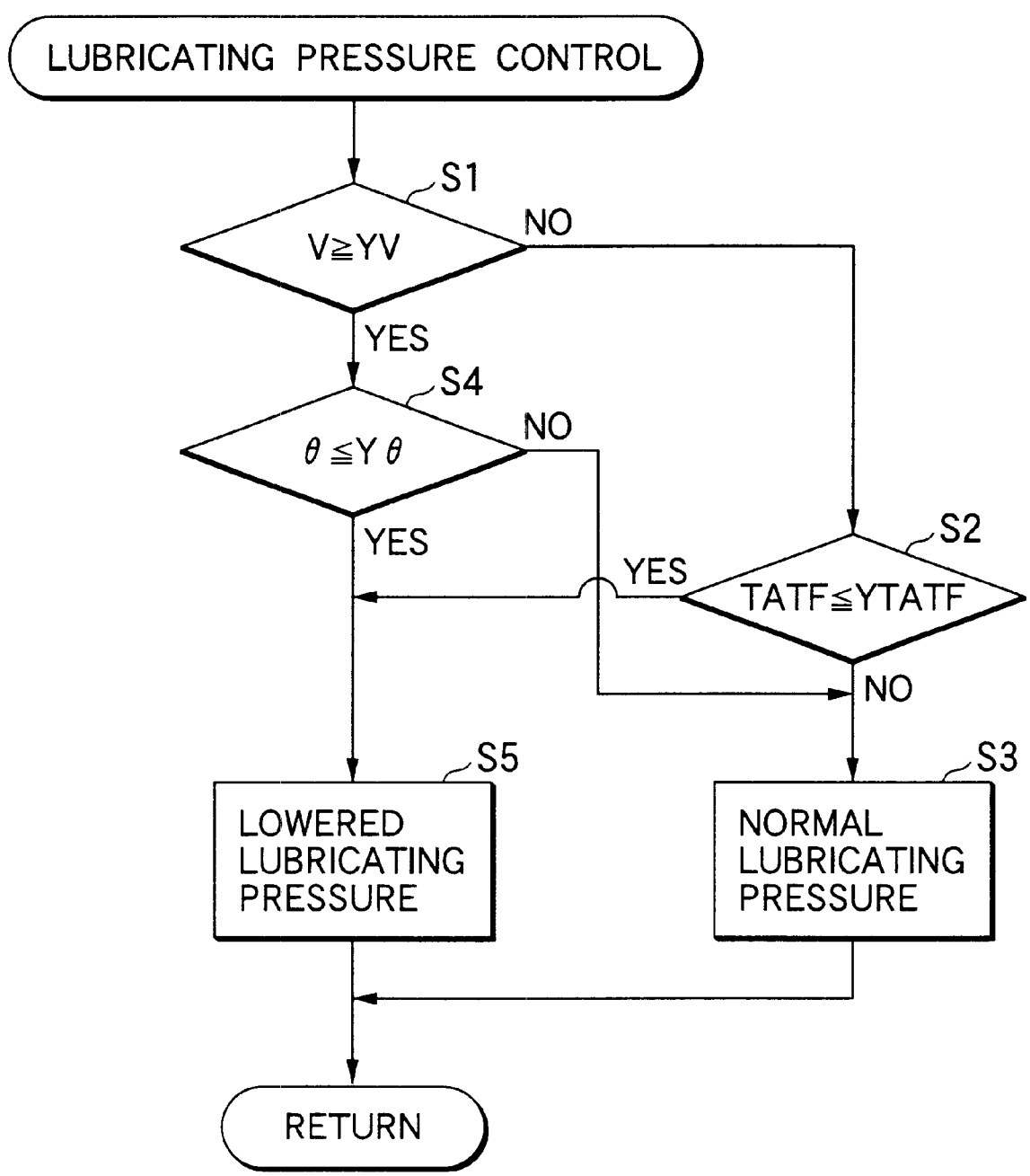

HYDRAULIC CONTROL APPARATUS FOR A
VEHICULAR AUTOMATIC TRANSMISSION

RELATED APPLICATIONS

This application claims priority to Japanese Patent Application No. P.2000-268964 filed on Sep. 5, 2000 in Japan. The contents of the aforementioned application are hereby incorporated by reference.

BACKGROUND OF THE INVENTION

1. Field of the Invention

The present invention relates to a hydraulic control apparatus for a vehicular automatic transmission for inputting power from an engine.

2. Description of the Related Art

Conventionally, a hydraulic control apparatus of this type is constructed such that a part of oil discharged from a hydraulic pump is supplied to a main hydraulic circuit portion for controlling various types of hydraulic actuators provided on an automatic transmission, whereas a part of the oil discharged from the hydraulic pump is supplied to a lubricating system of the automatic transmission and an oil cooler.

Incidentally, the oil temperature of the automatic transmission tends to be increased when the vehicle is running at high speed. To cope with this, it is desired that the volume of oil that is supplied to the oil cooler is increased to control the increase in oil temperature.

SUMMARY OF THE INVENTION

An object of the invention is to provide a hydraulic control apparatus for a vehicular automatic transmission which matches the aforesaid desire.

With a view to attaining the object, according an aspect of the invention, there is provided a hydraulic control apparatus for a vehicular automatic transmission for inputting power from an engine, wherein a part of oil discharged from a hydraulic pump is supplied to a main hydraulic circuit portion for controlling various types of hydraulic actuators provided on the automatic transmission, whereas the part of the oil discharged from the hydraulic pump is supplied to a lubricating system of the automatic transmission and an oil cooler, the hydraulic control apparatus comprising an oil volume changing unit changing a volume of oil to be supplied to the lubricating system and a volume oil to be supplied to the oil cooler, a vehicle speed determining unit determining whether or not the vehicle speed is equal to or faster than a predetermined value, a load determining unit determining whether or not the engine load is equal to or greater than a predetermined value, and a control unit for controlling the oil volume changing unit such that in the event that the vehicle speed is equal to or faster than the predetermined value, whereas the engine load is equal to or smaller than the predetermined value, the volume of oil to be supplied to the oil cooler is increased, whereas the volume of oil to be supplied to the lubricating system is decreased.

When the engine load is low or lower than the predetermined value, the volume of lubricating oil may be small. Thus, with the vehicle speed being equal to or faster than the predetermined value and the engine load being equal to or lower than the predetermined value, the volume of oil to be supplied to the lubricating system can be decreased, whereas the volume of oil to be supplied to the oil cooler can be increased, whereby the increase in oil temperature can be controlled without a shortage of oil being caused. In addition, the decrease in oil volume to be supplied to the lubricating system may reduce the friction loss and suppress the deterioration of oil supplied to the lubrication portions due to agitation of oil.

BRIEF DESCRIPTION OF THE DRAWINGS

FIG. 3 is a flowchart showing a control program of lubricating pressure.

DETAILED DESCRIPTION OF THE PREFERRED EMBODIMENTS

Figure 1:
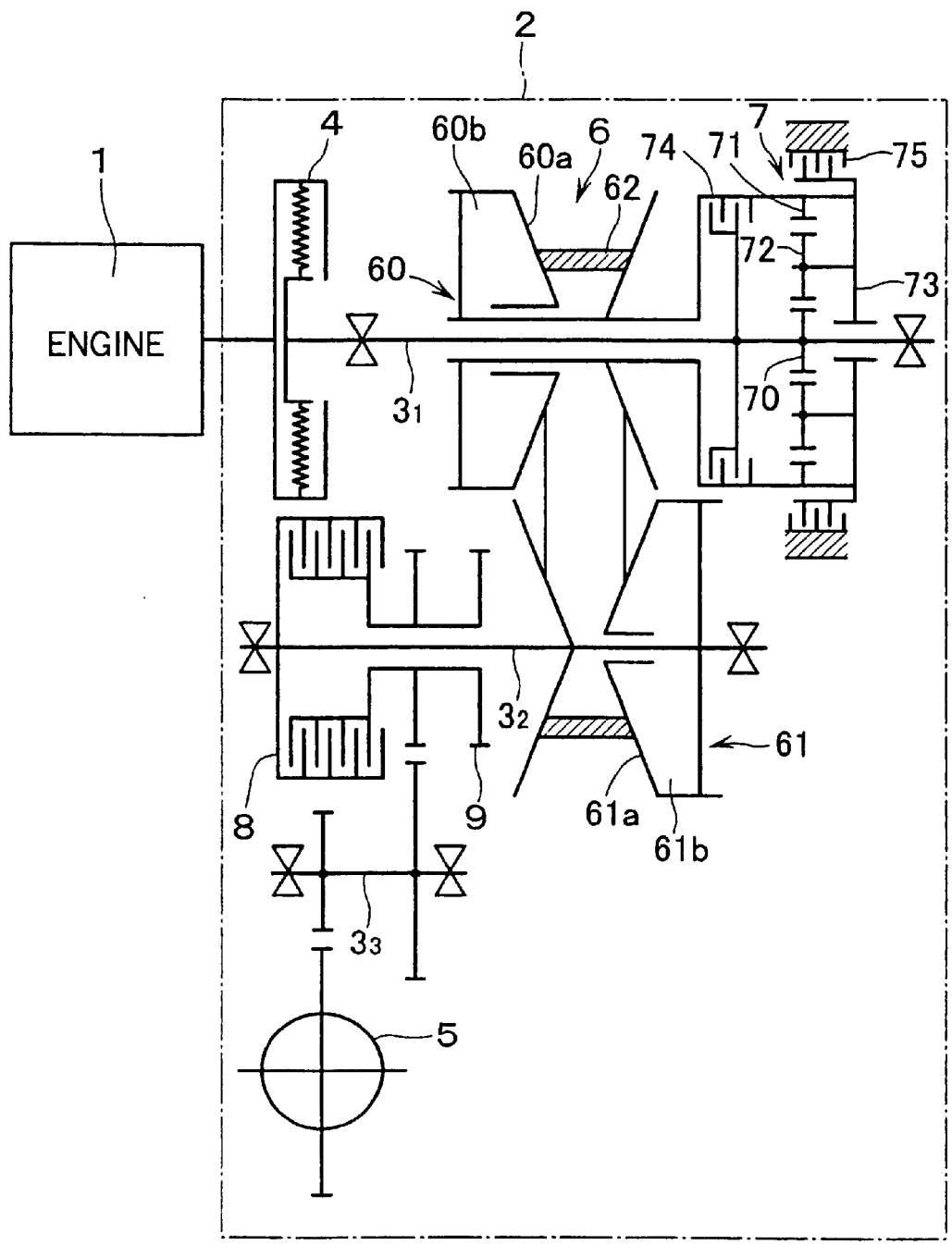
FIG. 1 is a skeleton diagram showing an automatic transmission to which an apparatus according to the invention is applied.

Referring to FIG. 1, reference numeral 1 denotes an engine, and reference numeral 2 denotes an automatic transmission. The automatic transmission 2 includes three first to third shafts 31, 32, 33 which are arranged in parallel to each other. The first shaft 31 is connected to the engine 1 via a damper 4, while the third shaft 33 is connected to driving road wheels (not shown) of a vehicle via a differential gear 5.

A belt-type continuously variable transmission mechanism 6 is provided between the first shaft 31 and the second shaft 32. The continuously variable transmission mechanism 6 is constituted by a drive pulley 60 rotatably supported on the first shaft 31, a driven pulley 61 fixed onto the second shaft 32 and a belt 62 extended between the two pulleys 60, 61 for controlling internal pressures of hydraulic cylinders 60b, 61b for pressing movable sheaves 60a, 61a so as to change the diameter of the belt 62 wound around the pulleys 60, 61, respectively for implementing continuous shifting.

A forward and reverse gears changing mechanism 7 is provided on an input side of the continuously variable transmission mechanism 6 for connecting the drive pulley 60 to the first shaft 31. In addition, a starter clutch 8 is provided on an output side of the continuously variable transmission mechanism 6 for connecting the second shaft $3_2$ to the third shaft $3_3$. In the figure, reference numeral 9 denotes a parking brake.

The forward and reverse gears changing mechanism 7 is constituted by a planetary gear mechanism having a sun gear 70 fixed to the first shaft $3_1$, a ring gear 71 rotably supported on the first shaft $3_1$, a planetary gear 72 meshing with the sun gear 70 and the ring gear 71 and a carrier 73 for carrying the planetary gear 72 which is connected to the drive pulley 60. In addition, there are provided a forward clutch 74 for connecting the carrier 73 to the first shaft 31 and a reverse brake 75 for stopping the rotation of the ring gear 71, whereby when the forward clutch is turned on the drive pulley 60 rotates in a normal direction so as to transmit power in a forward direction, whereas when the reverse brake 75 is turned on the drive pulley 60 rotates in a reverse direction so as to transmit power in a reverse direction.

Figure 2:
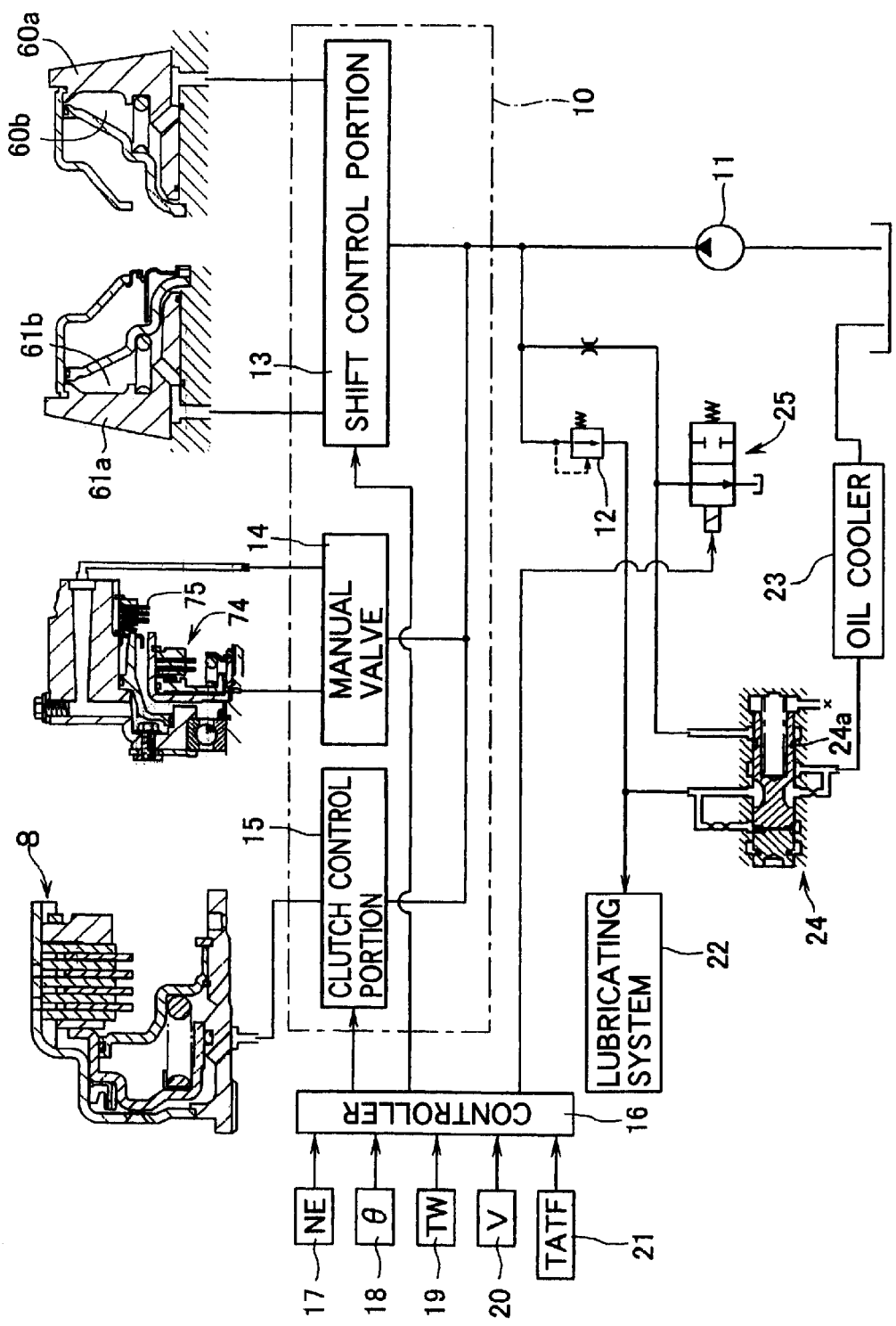
FIG. 2 is a hydraulic circuit diagram showing a hydraulic control apparatus for the automatic transmission shown in FIG. 1.

Provided in a control apparatus for the aforesaid automatic transmission 2, as shown in FIG. 2, is a main hydraulic circuit 10 for controlling various types of hydraulic actuators of the automatic transmission 2 such as the movable sheaves 60a, 61a of the respective pulleys 60, 61, the forward clutch 74, the reverse brake 75 and the starter clutch 8. The pressure of oil discharged from a hydraulic pump 11 adapted to be driven by the engine 1 is regulated by a regulator 12 to a predetermined line pressure for supply to the main hydraulic circuit 10. The main hydraulic circuit 10 includes a shift control portion 13, a manual valve 14 and a clutch control portion 15. The shift control portion 13 implements automatic gear shifting by controlling the hydraulic pressure that is supplied to oil chambers 60b, 61b of the movable sheaves 60a, 61a of the respective pulleys 60, 61. The manual valve 14 changes over between the supply of oil to and discharge of oil from the forward clutch 74 and the reverse brake 75. The clutch control portion 15 controls the hydraulic pressure of the starter clutch 8. Note that electromagnetic valves (not shown) are provided in the shift control portion 13 and the clutch control portion 15 which are adapted to be controlled by a controller 16 consisting of a on-board computer. Inputted into the controller 16 are signals from various types of sensors such as those 17, 18, 19 for detecting the speed NE of the engine 1, throttle opening $\theta$ and coolant temperature TW, respectively, a sensor 20 for detecting the vehicle speed V and a sensor 21 for detecting the oil temperature TATF of the automatic transmission 2.

Of an oil discharged from the hydraulic pump 11, the oil leaked by the regulator 12 is supplied to a lubricating system 22 of the automatic transmission 2 and an oil cooler 23. Here, the pressure of oil (the lubricating pressure) that is supplied to the lubricating system 22 is regulated by a lubricating regulator 24, and leak oil from the lubricating regulator 24 is designed to be supplied to the oil cooler 23. An oil chamber 24a is provided in the lubricating regulator 24 for pressing the same regulator to a close side on the left-hand side, and an electromagnetic valve 25 is connected to the oil chamber 24a which electromagnetic valve is controlled by the controller 16 so that the state of the oil chamber 24a can freely changed over by the electromagnetic valve 25 between a state in which the line pressure is inputted into the oil chamber 24a and a state in which the oil chamber 24a is opened to the atmosphere. When the line pressure is inputted into the oil chamber 24a, the lubricating pressure is increased, whereby the volume of oil that is supplied to the lubricating system 22 is increased whereas the volume of oil that is supplied to the oil cooler 23 is decreased. In contrast, when the oil chamber 24a is opened to the atmosphere, the lubricating pressure is decreased, and the volume of oil that is supplied to the lubricating system 22 is decreased whereas the volume of oil that is supplied to the oil cooler 23 is increased. Thus, the lubricating regulator 24 and the electromagnetic valve 25 constitute an oil volume changing unit for changing the volume of oil that is supplied to the lubricating system 22 and the volume of oil that is supplied to the oil cooler 23, and the controller 16 constitutes a control unit controlling the oil volume changing unit.

The detailed control of the lubricating pressure by the controller 16 via the electromagnetic valve 25 is as shown in FIG. 3. Firstly, it is determined in step S1 whether or not the vehicle speed V is faster than a predetermined vehicle speed YV (for example, 100 km/h), and if V<YV, it is determined in step S2 whether or not the oil temperature TATF of the automatic transmission 2 is a low temperature (for example, 0° C.) equal to or lower than a predetermined temperature YTATF. If TATF>YTATF, in step S3, the line pressure is inputted into the oil chamber 24a by the electromagnetic valve 25 to thereby set the lubricating pressure to the normal value.

In addition, if V≧YV, it is determined in step S4 whether or not the throttle opening $\theta$ is equal to or smaller than a predetermined value Y$\theta$ (for example, ⅛ opening) or whether or not there exists a low load state. If $\theta$>Y$\theta$, processing proceeds to step S3 where the lubricating oil is set to the normal value. In contrast, if $\theta$≦Y$\theta$, in step S5, the oil chamber 24a is opened to the atmosphere by the electromagnetic valve 25 to thereby decrease the lubricating pressure. Additionally, when it also is determined in step S2 that TATF≦YTATF, processing proceeds to step S5 where the lubricating pressure is decreased.

Thus, in a high speed running state as with V≧YV, and also in a low load state as with $\theta$≦Y$\theta$, in step S5, the volume of oil that is supplied to the oil cooler 23 is increased due to decrease in lubricating pressure, the increase in oil volume is suppressed which tends to occur at the time of high-speed running. Furthermore, the volume of oil that is supplied to the lubricating system 22, whereby the friction loss is reduced, and the deterioration of oil due to agitation of oil is suppressed.

Furthermore, when the temperature of oil is low, oil supplied to the lubricating system 22 is easy to be held at the lubricating portions due to the increase in viscosity, and the oil level is lowered to thereby cause aeration with ease. According to the embodiment of the invention, however, since the volume of oil to be supplied to the lubricating system 22 is decreased due to decrease in lubricating pressure as described above when the oil temperature is low, the lowering of the oil level is suppressed to thereby improve the aeration toughness.

In addition, in the above embodiment, while the throttle opening $\theta$ is used as a parameter indicating the engine load, it may be determined whether or not the engine is in the low load state by using other parameters such as the intake vacuum of the engine or the like. In addition, while the invention is applied to the hydraulic control apparatus for the continuously variable automatic transmission in the above embodiment, the invention may be applied to a hydraulic apparatus for a multi-staged automatic transmission.

As is clear from what has been described heretofore, according to the invention, the increase in oil temperature when running at high speed can be prevented effectively. Furthermore, the friction loss can also be reduced, and moreover, the deterioration of oil can be suppressed.

What is claimed is:

1. A hydraulic control apparatus for a vehicular automatic transmission for inputting power from an engine, wherein a part of oil discharged from a hydraulic pump is supplied to a main hydraulic circuit portion for controlling various types of hydraulic actuators provided on said automatic transmission, whereas a part of said oil discharged from said hydraulic pump is supplied to a lubricating system of said automatic transmission and an oil cooler, said hydraulic control apparatus comprising:

an oil volume changing unit changing a first volume of oil to be supplied to said lubricating system and a second volume of oil to be supplied to said oil cooler;

a vehicle speed determining unit determining whether or not the vehicle speed is equal to or faster than a predetermined speed;

a load determining unit determining whether or not the engine load is equal to or greater than a predetermined value; and a control unit controlling said oil volume changing unit such that in the event that the vehicle speed is equal to or faster than the predetermined speed, whereas the engine load is equal to or smaller than the predetermined value, the second volume to be supplied to said oil cooler is increased, whereas the first volume to be supplied to said lubricating system is decreased.

2. The hydraulic control apparatus for a vehicular automatic transmission according to claim 1, further comprising:

an oil temperature determining unit determining whether or not an oil temperature of said automatic transmission is equal to or smaller than a predetermined temperature, wherein a control unit controlling said oil volume changing unit such that in the event that the vehicle speed is smaller than the predetermined speed, whereas the oil temperature is equal to or smaller than the predetermined temperature, the second volume to be supplied to said oil cooler is increased, whereas the first volume to be supplied to said lubricating system is decreased.

3. The hydraulic control apparatus for a vehicular automatic transmission according to claim 1, wherein said oil volume changing unit includes an electromagnetic valve controlled by said control unit and a lubricating regulator with an oil chamber changeable by an operation of said electromagnetic valve between a first state that the second volume to be supplied to said oil cooler is increased, whereas the first volume to be supplied to said lubricating system is decreased and a second state that the second volume to be supplied to said oil cooler is decreased, whereas the frist volume to be supplied to said lubricating system is increased.

4. The hydraulic control apparatus for a vehicular automatic transmission according to claim 1, wherein said first state is obtained by opening said oil chamber of said lubricating regulator to the atmosphere, and said second state is obtained by inputting the line pressure regulated by a regulator into said oil chamber of said lubricating regulator.

* * * * *